United States Patent [19]
Roberts et al.

[11] 3,752,077
[45] Aug. 14, 1973

[54] RELEASE CONNECTOR FOR A RISER OF A PARACHUTE FLARE

[75] Inventors: Henry J. Roberts, Ogden; Willard F. Davis, Brigham City, both of Utah

[73] Assignee: Thiokol Chemical Corporation, Bristol, Pa.

[22] Filed: June 4, 1970

[21] Appl. No.: 43,331

[52] U.S. Cl................................. 102/35, 244/142
[51] Int. Cl............................................ F42b 13/38
[58] Field of Search................ 102/35, 35.6, 34.4, 102/37.6, 49.5, 37.1; 89/1 B; 85/8.8

[56] References Cited
UNITED STATES PATENTS

| | | | |
|---|---|---|---|
| 3,515,362 | 6/1970 | Richardson et al. | 102/37.1 |
| 3,460,427 | 8/1969 | Baumgarten | 85/8.8 |
| 2,749,162 | 6/1956 | Humphrey | 85/8.8 |
| 3,389,923 | 6/1968 | Love et al | 85/8.8 |
| 3,122,392 | 2/1964 | Benditt et al | 89/1 B |
| 3,530,759 | 9/1970 | Francis | 89/1 B |
| 3,036,522 | 5/1962 | Lindsey | 89/1 B |
| 2,926,565 | 3/1960 | Thorness | 89/1 B |
| 3,546,999 | 12/1970 | Hosang | 89/1 B |
| 3,388,879 | 6/1968 | Pisano et al. | 89/1 B |
| 1,782,291 | 11/1930 | Driggs, Jr. et al. | 102/35 |

*Primary Examiner*—Robert F. Stahl
*Attorney*—William R. Wright, Jr.

[57] ABSTRACT

In association with parachuted illuminating flares, an improved riser to flare connector is provided which automatically releases one or more of the parachute risers to spill air out of the parachute when the flare is spent and thus causes the empty container to drop. The connector separates automatically at a predetermined temperature and is explosively operated. Also, the connector is easily and quickly assembled to the flare since it includes a plug and a socket into which the plug fits with a "snap-in" action.

2 Claims, 3 Drawing Figures

3,752,077

PATENTED AUG 14 1973

Henry J. Roberts
Willard F. Davis
INVENTORS

BY
William R. Wright Jr.
AGENT

PATENTED AUG 14 1973 3,752,077

Henry J. Roberts
Willard F. Davis
INVENTORS

BY
William R. Wright Jr.
AGENT

RELEASE CONNECTOR FOR A RISER OF A PARACHUTE FLARE

The present invention relates to a device for connecting two parts together but which can be instantly released. It relates more particularly to such a connector wherein the force of an explosive is used to effect separation of the two previously connected parts. Such a device is particularly useful as a positive release connector for the attachment of a parachute riser or risers to an illuminating flare where it is desirable, after the flare is spent, to release one or more of the risers in order to spill air from the parachute to let the spent flare casing drop rapidly to the ground.

Illuminating flares of the aforementioned type are well known and some have been proposed in the art which include a provision for the riser release feature in order that the air may be cleared quickly of spent flares and thus reduce the danger of collision with an aircraft or of jet engine ingestion of the flare casing, parachute and other related parts. These, however, use cutting or gripping mechanisms to either sever the riser or to let it go, the mechanisms sometimes being explosively motivated. As with any mechanism, the usual problems of friction increased by corrosion effects are present along with the possibility of mechanical failure of the moving parts such as the various needed springs, pivots, knives and other parts. The present invention, however, eliminates any need whatsoever for a cutting or gripping mechanism and provides instead a simple non-mechanical fitting which is blown apart in a prescribed area by a detonator which explodes when the heat of the burning flare illuminant finally heats it to its detonating temperature.

It is, therefore, an object of the present invention to provide a connector for a riser of a parachute flare which, once installed, has no moving parts and includes a temperature sensitive detonator which explodes to blow apart the connector and thus release the cable.

It is also an object of the present invention to provide a connector of the foregoing type which is practically unaffected by corrosion, light weight, easy to assemble and completely automatic in operation.

Other objects and advantages of the present invention will be apparent from the description and claims which follow.

Figure 1:
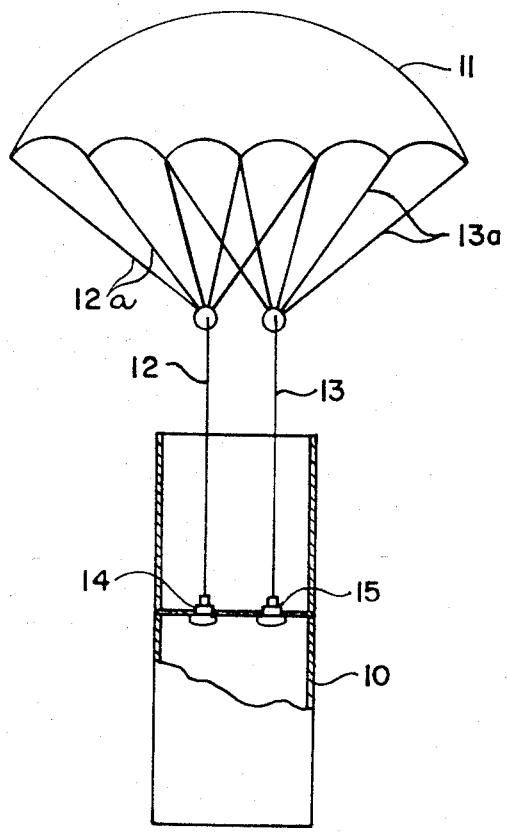
FIG. 1 is a view of the parachute flare with the parachute canopy open and the flare descending.

A preferred embodiment of the invention includes a flare body or canister 10 to which parachute canopy 11 is attached by a pair of risers 12 and 13 fastened to it by connectors 14 and 15. Risers 12 and 13 fan out in their upper portions into shroud lines 12a and 13a which attach at evenly spaced locations about the outer periphery or skirt of the canopy 11. All of the shroud lines from one riser are attached to that half of the canopy on the riser's side so that its release will allow that half of the canopy to spill its air and thus cause the parachute to collapse with the result that the spent flare falls rapidly to the earth. Attached to the lower end of riser 13 in the drawings and to flare canister 10 is connector 15 which comprises plug 18, socket 19 and snap ring 23 and includes a chamber 17 open to the illuminant combustion area (when the illuminant has burned away practically completely) in which a detonator 17 is located. Dentonator 17 is principally an explosive such as RDX (cyclotrimethylenetrinitrimine) or PETN (pentaerythrityltetranitrate) and is preferably in the form of an easily inserted cartridge or pellet.

Figure 2:
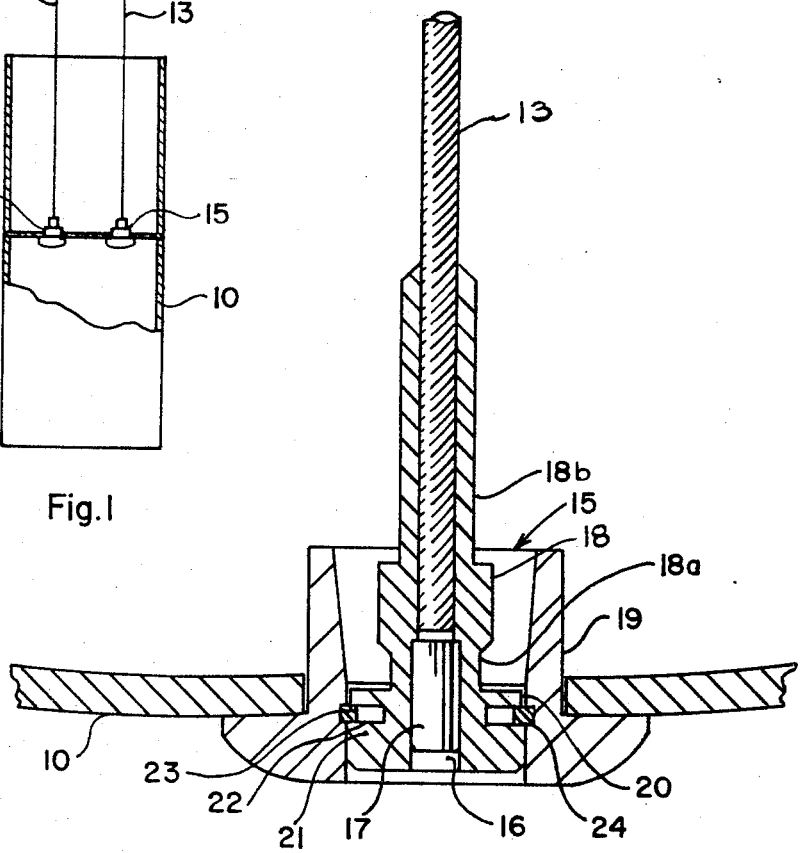
FIG. 2 is a cross-sectional enlarged view of the connector prior to release and showing the detonator in place.

As will be seen in FIG. 2, the riser cable 13 terminates in the sleeve portion 18b of plug 18 and is swaged in place so as to form a strong joint capable of withstanding the shock loads inposed by the opening of the canopy 11 as well as the normal loads during the descent of the flare with the canopy open. At the lower end of plug 18 is an annular shoulder 20 of larger diameter than sleeve portion 18b and which has an annular groove 22 in its periphery in which is located a snap ring 23. This whole plug assembly fits loosely into socket 19 which in turn is fitted into the top of canister 10 as shown. An annular groove 24 sufficient to accept snap ring 23 to about one-half of its annular cross section is provided in the wall of socket 19 as shown. The upper portion of socket 19 is chamfered on its inner surface as shown in order to provide an easy entry for plug 18.

From the foregoing, it will be seen that plug 18 is easily assembled into socket 19 simply by pushing it downward into socket 19 until the ring 23 snaps into groove 24 and retains plug 18 by overlapping grooves 22, 24. Plug 18 cannot be removed once it is installed.

Figure 3:
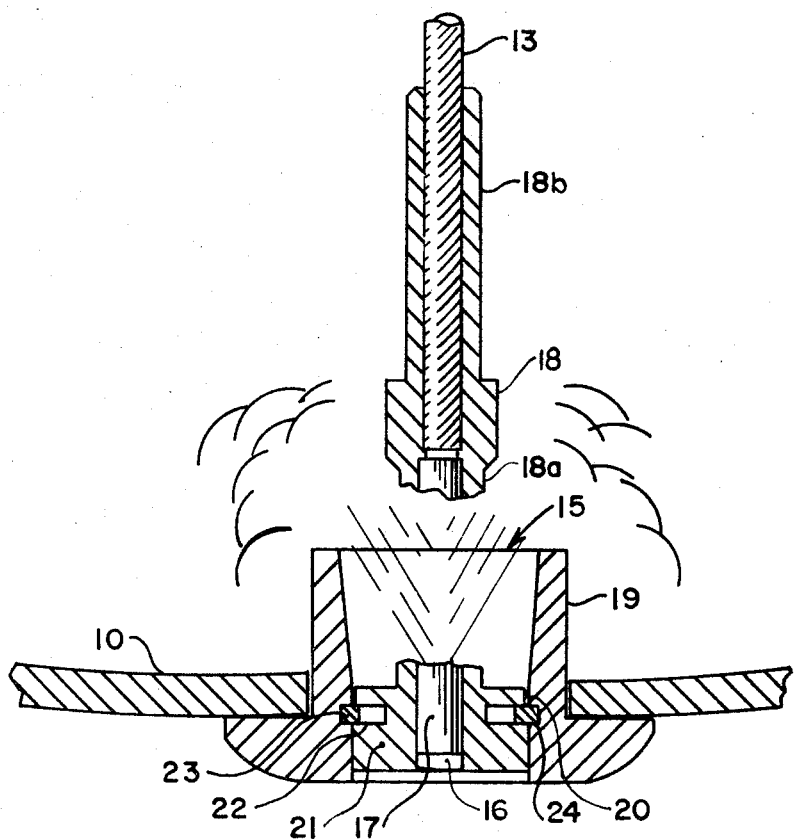
FIG. 3 is a cross-sectional view of the connector after the explosion of the detonator has taken place.

In operation, the flare is dropped from an aircraft after which the parachute opens and the flare's illuminant becomes ignited and burns as the flare slowly descends. When the illuminant has been almost completely consumed, the heat of its combustion raises the temperature of the explosive pellet 17 in chamber 16 of plug 18 sufficiently to cause it to detonate. The force of this explosion is greater than plug 18 can withstand and it fails immediately in the area of its thin-walled or necked-down portion 18a as will be seen in FIG. 3 thus releasing riser 13 and its associated shroud lines 13a and allowing the right hand half (in FIG. 1) of canopy 11 to spill its air and thus collapse the parachute canopy 11. When this occurs, the spent canister 10 and all other parts of the flare and parachute fall rapidly to the earth and thus clear the air to allow aircraft to complete their missions without the danger of collision with a slowly descending spent flare which is unilluminated and therefore practically invisible in the darkness of the night.

The detonable riser release connector of the present invention combines the advantages of great simplicity, light weight, small size, and positive, completely effective and immediate action.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only by the scope of the following claims.

What is claimed is:

1. In combination with a parachute flare having a flare canister attached to a parachute by a riser and a combustion area in said flare canister, a riser release comprising a connector between the riser and the flare canister, a detonator explosive at a predetermined temperature within said connector with at least one end of the detonator exposed to the combustion area of the flare with the connector including a socket fixedly attached to the canister, a plug fixedly attached to the riser cable and adapted to fit within the socket and positive plug retainer means within the socket, the retainer means including an annular groove in the socket, a corresponding annular groove in the plug, a snap ring compressed in the groove in the plug upon assembly and adapted to spring out into the socket slot sufficiently to intercept both grooves, whereby the plug is retained in the socket by said ring.

2. The invention set forth in claim 1 with the socket including a chamfered entrance which serves to guide and compress the snap ring during assembly of the plug to the socket.

* * * * *